Sept. 8, 1959 — J. M. WOODLEY — 2,902,791
WRIGGLING SPINNER WITH UNBALANCED ROTORS
Filed June 4, 1957
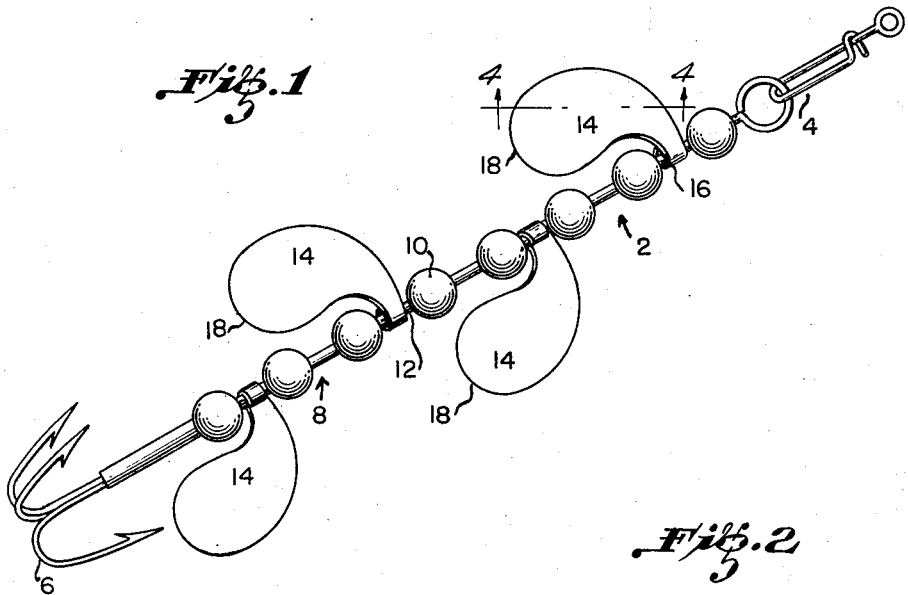
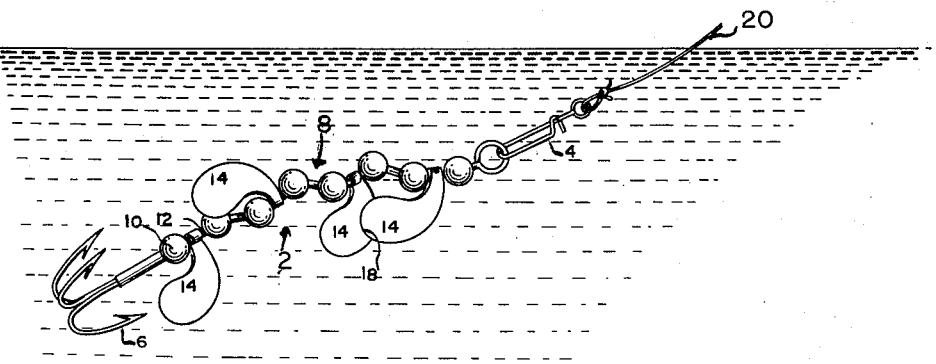
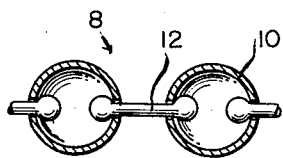
INVENTOR
JAMES M. WOODLEY
BY James H. Littlepage
ATTORNEY

2,902,791
WRIGGLING SPINNER WITH UNBALANCED ROTORS

James M. Woodley, Maplewood, La.

Application June 4, 1957, Serial No. 663,459

1 Claim. (Cl. 43—42.17)

This invention relates to fishing lures and, more particularly, to a lure having a flexible body and a plurality of unbalanced rotor blades spaced along its length so as to provide a wriggling and squirming action, and to create clicking noises in the water.

The object of this invention is to provide a spinning type lure which, in contrast with the usual propeller blades or rotors, mounted on a stiff wire or body, has spaced along the flexible body thereof a series of closely spaced single rotor blades which provide a slight wriggling action of the lure as it is pulled through the water. It is intended particularly to provide a lure having spinning blades which, under some circumstances, spin free of one another, but, as the flexible body is caused by the unbalanced blades to wriggle and bend, adjacent blades will interfere with one another and create a rapid clicking action so as to attract fish to the lure.

These and other objects will be apparent from the following specification and drawings, in which:

Fig. 1 is a side elevation of the lure;

Fig. 2 is a side elevation of the lure showing, with exaggeration, the action as it is pulled through the water.

Fig. 3 is an enlarged fragmentary cross section showing the construction of the ball chain body; and, Fig. 4 is a cross section along the line 4—4 of Fig. 1.

Referring now to the drawing in which like reference numerals denote similar elements, the lure 2 is provided a conventional line attachment 4 at its leading end and a gang hook 6 secured in conventional manner to its trailing end. Between the leading and trailing ends, the lure body is formed of a ball chain 8 consisting of balls 10 and headed links 12 swiveled between the balls. Closely spaced along the length of ball chain 8 are a plurality of single rotor blades 14 formed of bent thin sheet material having hub loops 16 bent loosely around links 12 of the ball chain so as to permit free spinning of the rotor blades. Blades 14 may, of course, be formed of molded material, such as plastic. It should be noted particularly that rotor blades 14 have overhanging rear ends 18 which extend almost to the next succeeding rotor blades. Thus, when the lure is straight as shown in Fig. 1, rotor blades 14 spin freely without mutual interference.

Referring particularly to Fig. 2, the action of lure 2 as it is pulled through the water by a line 20 is shown with exaggeration for purposes of illustrating the principle of operation. As soon as rotor blades start to spin, their unbalanced forces exerted reactively on flexible ball chain 8 cause the chain to wriggle and squirm as it is pulled through the water. As sections of the chain bend, some of the adjacent rotor blades 14 come sufficiently close together that the trailing end 18 of one blade strikes against the body of the next succeeding blade. In the illustrated embodiment, the blades are bent so that they all spin in the same direction. However, because of variations in hub friction and slight manufacturing differences in the bends of the blades, the blades do not all spin at the same speed and interference between adjacent blades almost immediately occurs, thereby setting up a slight, but nevertheless effective rapid clicking noise in the water. If desired, alternate blades may be bent to spin in opposite directions and thereby increase the recurrence of interference, with a resultant increase in the clicking produced by the lure. In actual tests, lure 2 has been found very effective.

It will be apparent to those skilled in the art that different numbers of rotor blades 14 may be utilized and flexible bodies other than the illustrated ball chain will provide the necessary wriggling and squirming action. The invention is not limited to the details described and illustrated hereinbefore, but it is intended to cover all substitutions and modifications and equivalents within the scope of the following claim.

I claim:

In a fishing lure, a ball chain body having front and rear ends, comprising a series of balls, rod links swivelly connecting said balls to one another, means for attaching a line to the front end of said body, and plurality of normally free-spinning rotors, said rotors being formed of flat sheet material having a hub portion and a single blade portion, said hub portion being a cylindrical bend rotatably encircling a rod link, said blade portion extending outwardly and thence rearwardly from said hub portion, adjacent rotors being of opposite pitch with the rearwardly extending portion of one rotor being normally spaced immediately forwardly of the outwardly extending portion of the next succeeding blade, said blade portions extending outwardly on one side only of said hub portions and the rotation thereof thereby producing unbalanced reactive forces on the links on which their respective hubs are mounted, thereby causing said ball chain body to squirm from side to side along its length, and normally resulting in a corresponding rearward excursions of the blade portion, the spacing between the rearwardly extending portion of one blade and the outwardly extending portion of the next succeeding blade being less than the normal rearward excursions of the blades thereby causing interference between the successive blades.

References Cited in the file of this patent

UNITED STATES PATENTS

| 849,743 | Martin | Apr. 9, 1907 |
| 2,223,475 | Withey | Dec. 3, 1940 |
| 2,277,350 | Phillips | Mar. 24, 1942 |
| 2,516,434 | Swan | July 25, 1950 |

FOREIGN PATENTS

| 281 | Great Britain | 1890 |
| 467,809 | Canada | Sept. 5, 1950 |
| 542,770 | France | May 22, 1922 |